June 23, 1936.  M. C. THOMAS  2,045,209
LISTER PLOW ATTACHMENT FOR TRACTORS
Filed July 16, 1935  2 Sheets—Sheet 1
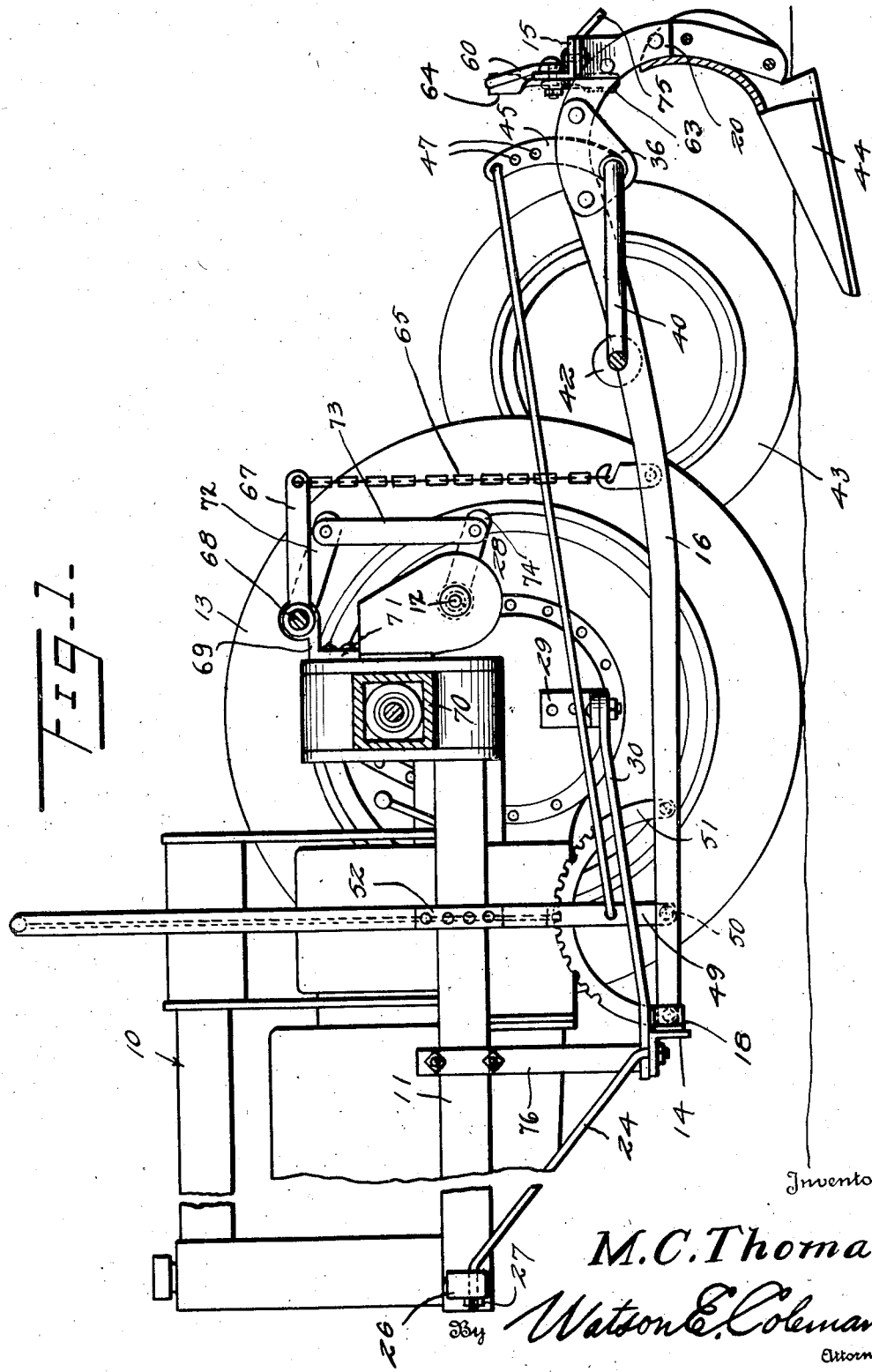
Inventor
M. C. Thomas
By Watson E. Coleman
Attorney

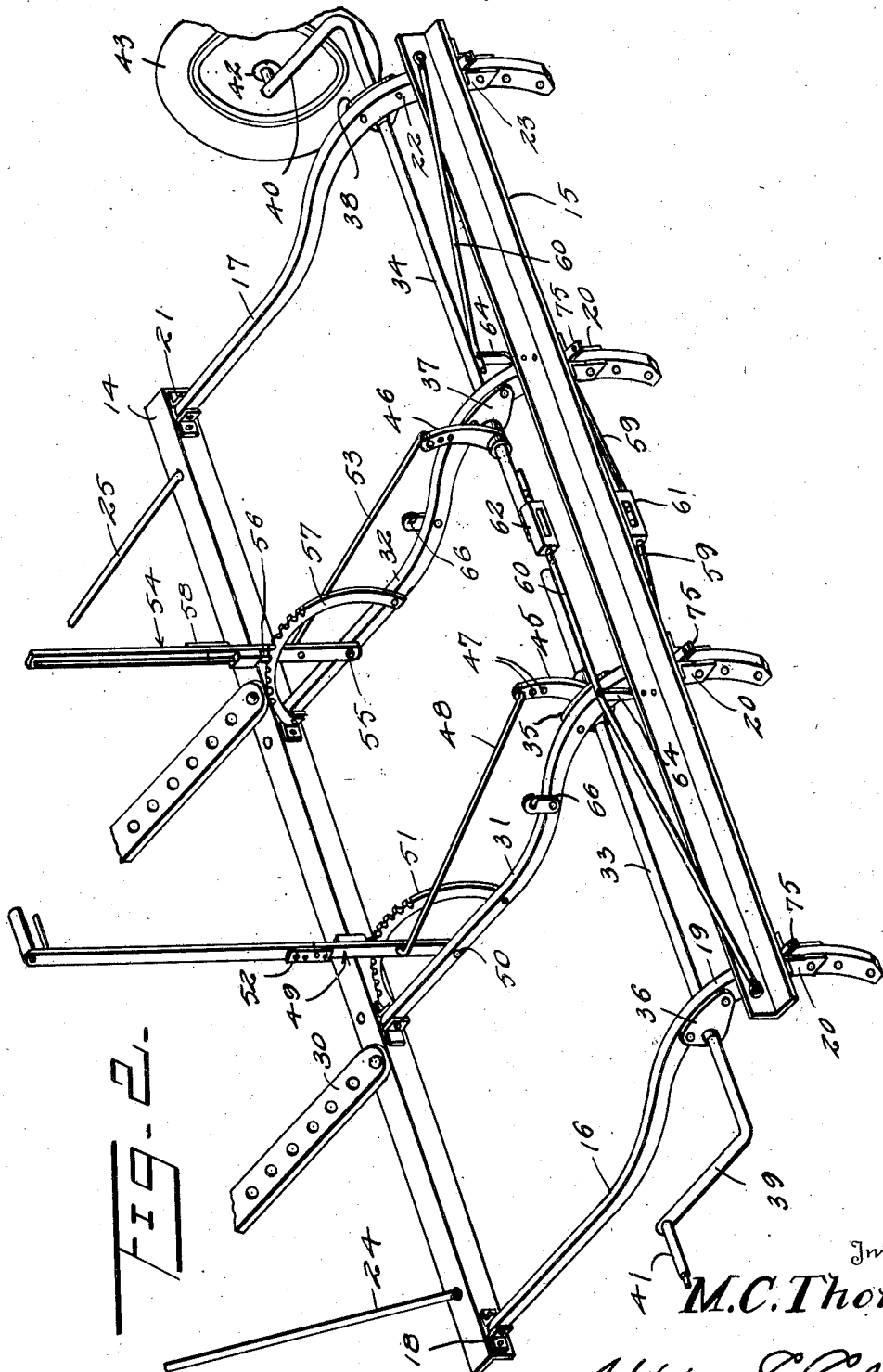

Patented June 23, 1936

2,045,209

UNITED STATES PATENT OFFICE 2,045,209

LISTER PLOW ATTACHMENT FOR TRACTORS

Marion Claude Thomas, Post, Tex.

Application July 16, 1935, Serial No. 31,693

1 Claim. (Cl. 97—47)

This invention relates to lister plows and more particularly to an attachment of this character which may be applied to a tractor.

An object of this invention is to provide an attachment of this character which is so constructed that it may be quickly applied and removed from a conventional tractor and which embodies operating means for the plows which can be readily grasped by the operator when positioned on the usual seat provided on the tractor.

A further object of this invention is to provide a construction of this character which may be coupled with the power take-off of the tractor so as to raise the lister plow structure off of the ground in order to conveniently move the device.

The above and various other objects and advantages of this invention will in part be described in, and in part be understood from the following detail description of the present preferred embodiment, the same being illustrated in the accompanying drawings, wherein:

Figure 1 is a longitudinal section partly in detail of a device constructed according to an embodiment of this invention, showing the device in applied position on a tractor.

Figure 2 is a fragmentary perspective view of the attachment.

Referring to the drawings, wherein like numerals of reference designate corresponding parts throughout the several views, the numeral 10 designates generally a conventional tractor structure including a frame 11, rear wheels 13, and a power take-off 12. The tractor 10 herein disclosed is only a conventional type of tractor and it will, therefore, be understood that the hereinafter described lister attachment may be applied to other types of tractors.

In order to provide a lister plow attachment which may be easily and quickly attached and detached from the tractor 10, I have provided a frame structure including a front frame bar 14 and a rear frame bar 15. These bars 14 and 15 are substantially parallel with each other and disposed in spaced apart relation and, in the present instance, are constructed of angle material.

A pair of lister plow beams 16 and 17 are disposed one adjacent each end of the transverse bars 14 and 15. The beam 16 is pivotally secured at its front end between a pair of angle brackets 18 and is secured adjacent its rear end and on the curved downwardly extending part 19 between a pair of angle brackets 20. The beam 17 at its front end is secured between a pair of angle members 21 and the beam 17 on the curved downwardly extending part 22 is secured to the opposite end of the bar 15 between a pair of brackets or L-shaped members 23.

A pair of forwardly extending bars 24 and 25 are secured to the front frame bar 14, one adjacent each end, and extend forwardly of the frame structure including the bars 14 and 15 and the beams 16 and 17. The front ends of the bars 24 and 25 are detachably secured to upstanding brackets 26 disposed one on each side of the tractor frame 11 at the front end thereof. Preferably, the front ends of the draw bars 24 and 25 are threaded and a nut 27 is threaded on to the forward end of the draw bar 24, as shown in Figure 1.

The tractor 10 is provided on the gear housing 28 thereof with a bracket 29 which is usually fixedly secured to the housing 28 so that various attachments may be applied to the tractor. A draw bar 30 is secured to the bracket 29 and, in the present instance, this draw bar 30 is reversed and extends forwardly of the bracket 29 and is secured at its forward end to the front frame bar 14. The front end of the lister frame structure is, therefore, supported by means of the draw bars 24, 25 and 30.

A pair of beams 31 and 32 are disposed between the outer lister plow beams 16 and 17 and are adapted to be disposed closely adjacent the wheels 13 of the tractor, preferably, on the outer sides of the wheels 13 with the wheels 13 disposed between the front bar 14 and the rear bar 15. A pair of shafts 33 and 34 are journaled in bearings carried by the lister plow beams, the shaft 33 being journaled in bearings 35 and 36 carried by the beams 31 and 16, respectively. The shaft 34 is journaled in bearings 37 and 38 secured to the beams 32 and 17, respectively. The shafts 33 and 34 each have bell crank portions 39 and 40, respectively, and a spindle 41 is secured to the crank 35, whereas a spindle 42 is secured to the crank 40 and suitable wheels 43 may be mounted on the spindles 41 and 42.

The shafts 33 and 34 are held against rotation so as to maintain the bell crank portions 39 and 40 in desired position to maintain the plows 44 attached to the lower ends of the beams in either operative or inoperative position, by means of levers 45 and 46. The lever 46 is secured to the inner end of the shaft 33 and is provided with a plurality of spaced apart openings 47 in which a link 48 engages. This link 48 is secured at its front end to an adjusting lever 49 which is pivoted, as at 50, to the beam 31. A rack bar 51 is secured to the beam 31 and the lever 49 is adapted to engage this rack bar so as to hold the shaft 33 in its adjusted position. Preferably, the lever 49 is split intermediate its ends and secured as by a plate 52 so that the long end of the lever 49 may be lowered to inoperative position and thereby permit the positioning of the lister frame structure in a relatively small or low place.

The lever 46 is rocked by a link 53, which is secured at its front end to an adjusting lever 54, pivoted as at 55 to the beam 32. This lever 54 has a spring pressed pawl 56 engaging the teeth of a rack bar 57 so as to hold the lever 46 and the shaft 34 in adjusted position. This lever 54 is split after the manner of the lever 49 so that the upper portion thereof may be rocked downwardly, this being accomplished through a plate 58 which is secured to the two portions of the lever 54, as by bolts or the like.

The rear frame 15 is braced against longitudinal bending by means of bracing bars 59 and 60 which have turnbuckles 61 and 62 respectively, so that the bars 59 and 60 may be suitably tightened. Preferably, the bars 59 and 60 are held in spaced apart relation from the frame bar 15 by means of bracing members 63 and 64, respectively.

The lister frame structure hereinbefore described may be raised to inoperative position by means of flexible members 65 which are secured at their lower ends to hooks 66 carried by the beams 31 and 32 and the upper or forward ends of the flexible members 65 are secured to rock levers 67 carried by a rock shaft 68 which is mounted on a bearing 69. The bearing 69 is fastened to the axle housing 70 of the tractor 10 by means of a bracket or plate 71. A second rock lever 72 is secured to the shaft 68 and extends rearwardly of the axle housing 70. The lever 72 has a link 73 connected thereto and this link is connected to a rock lever 74 carried by the power take-off shaft 12. The forward end of the frame is also secured to the frame 11 of the tractor by means of a bar 76 which is disposed in a vertical position and is secured at its lower end to the front bar 12 and has its upper end secured as by bolts or the like to the frame 11 of the tractor.

In the use and operation of this device, the frame structure hereinbefore described is mounted by disposing the forward frame bar 14 on the ground and then backing the rear wheels 13 of the tractor 10 over the frame member 14 so that the rear wheels 13 will be disposed between the inner beam members 31 and 32. The draw bars 24, 25, and 30 are then secured to the tractor so as to support the forward end of the lister frame. If desired, suitable seed planting devices may be attached to rearwardly extending brackets 75 carried by the rear frame bar 15. The depth of the low members 44 carried by the beams is adjusted by the adjusting levers 49 and 54 which rock the shafts 33 and 34.

Due to the fact that the rear portion of the tractor 10 is disposed within the frame structure, the operator of the device can readily determine the condition of the seed hoppers which may be attached to the brackets 75. When it is desired to raise the plow structure so as to facilitate movement of the device over the ground, this may be accomplished by operating the power take-off 12 so as to raise the lever 74 which will rock the lever 67 upwardly. This will raise the rear portion of the lister frame structure completely off of the ground although it will, of course, be understood that the plow members 44 attached to the rear ends of the beams may be raised off of the ground by rocking of the levers 49 and 54.

It will be apparent from the foregoing that a lister plow structure has been disclosed which can be quickly attached to a conventional tractor and that this lister plow structure will not require an undue amount of power in the use thereof.

I claim:—

A lister plow attachment for tractors comprising a front frame bar, a rear frame bar parallel with the front bar, a plurality of spaced apart plow beams between the frame bars, means for pivotally securing the front ends of the beams to the front bar, means for fixedly securing the rear portions of the beams to the rear bar, a pair of alined shafts provided with bell crank outer end portions, wheels carried by said outer end portions, lever means connected to the inner ends of the shafts to raise or lower the rear ends of the plow beams, a pair of forwardly extending rods secured at their rear ends to the front frame bar, means at the front ends of said rods for securing the rods to the front portion of the tractor, a pair of apertured bars secured at one end to the front frame bar, and brackets adapted to be secured to the tractor adjacent the rear thereof and adapted to be secured to said apertured bars in a selected aperture.

MARION CLAUDE THOMAS.